Figure 1:
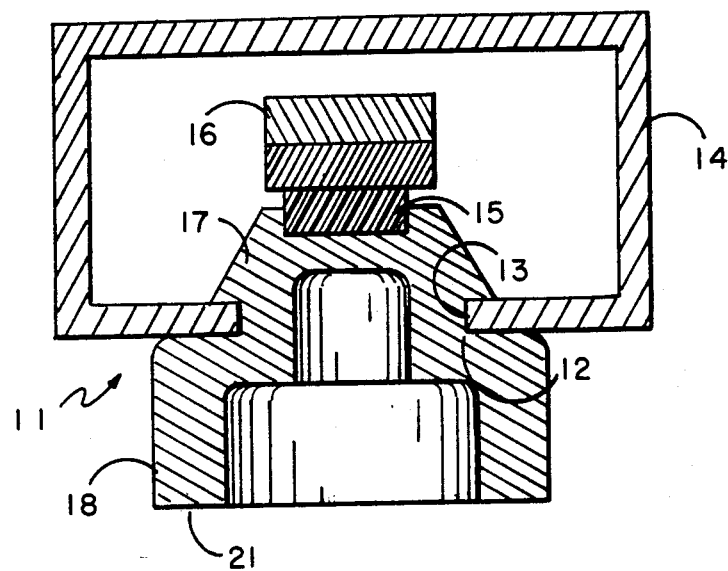

United States Patent [19]

Reynolds et al.

[11] Patent Number: 4,718,631
[45] Date of Patent: Jan. 12, 1988

[54] FOOT ISOLATING

[75] Inventors: David F. Reynolds, Wrentham; David Jacobs, Watertown, both of Mass.

[73] Assignee: Barry Wright Corporation, Newton Lower Falls, Mass.

[21] Appl. No.: 857,518

[22] Filed: Apr. 22, 1986

Related U.S. Application Data

[63] Continuation of Ser. No. 665,320, Oct. 26, 1984.

[51] Int. Cl.$^4$ ............................................. F16M 13/00
[52] U.S. Cl. .................................... 248/615; 248/638; 248/677; 206/592; 206/320
[58] Field of Search ............... 248/615, 634, 638, 632, 248/677, 560, 562; 206/592, 320; 267/141

[56] References Cited

U.S. PATENT DOCUMENTS

| | | | |
|---|---|---|---|
| 1,864,125 | 6/1932 | Dowd | 248/615 |
| 2,489,696 | 11/1949 | Boyden | 248/615 |
| 2,802,356 | 8/1957 | Kirby | 248/615 |
| 3,575,288 | 4/1971 | Brucken | 248/615 |

FOREIGN PATENT DOCUMENTS

| | | | |
|---|---|---|---|
| 462219 | 1/1950 | Canada | 248/632 |
| 695430 | 5/1958 | Canada | 248/615 |
| 191257 | 9/1964 | Sweden | 248/634 |
| 419018 | 11/1934 | United Kingdom | 248/632 |
| 651358 | 3/1951 | United Kingdom | 248/632 |
| 1187788 | 4/1970 | United Kingdom | 248/615 |

Primary Examiner—Reinaldo P. Machado
Assistant Examiner—Alvin Chin-Shue
Attorney, Agent, or Firm—Charles Hieken

[57] ABSTRACT

An antiskid shock and vibration isolating foot is formed with an annular circumferential recess about midway between its top and bottom and made of a resilient elastomer. A threaded stud is bonded to the top of the elastomer. The upper portion above the annular recess passes through an opening in a case base until the edge around the opening resides in the annular recess. The threaded stud passes through an opening in the base of a component. The stiffness of the upper portion above the annular recess is different from the stiffness of the lower portion below the annular recess. The portion above the recess is frustoconical and that below is substantially cylindrical.

8 Claims, 2 Drawing Figures

FOOT ISOLATING

This application is a continuation of application Ser. No. 665,320, filed Oct. 26, 1984, now abandoned.

The present invention relates in general to shock and vibration isolation and more particularly concerns novel apparatus and techniques for providing with a single structure both a foot for equipment and shock and vibration isolation for a component of the equipment from the main cabinet. The invention is especially advantageous for both interconnecting and vibrationally isolating two structures, such as a computer printer unit and its case.

Examples of prior art include U.S. Pat. Nos. 1,864,125, 1,457,058, 3,575,288, 2,802,356 and 2,869,811.

The most pertinent of these patents, U.S. Pat. No. 1,864,125, discloses rubber cups positioned in spaced relation in depressed portions of a typewriter base below the typewriter. A lower rubber cup is located below the base in registration with the upper cup. The pair of upper and lower cups is secured to the base and to the typewriter by a clamping screw passing through aligned openings in the cups and base with its upper end threaded for engagement in an opening in the typewriting machine frame. Each rubber cup is covered by a hard cap conforming to the cup shape and functions to prevent undue spreading of the cups and to prevent tipping or folding under of the cups in case the base and the machine are slid or pushed along a desk or other support.

It is an important object of the invention to provide an improved foot isolator that may function not only as a foot, but also provide shock isolation for a cabinet and shock isolation between the cabinet and a component in the cabinet.

According to the invention, apparatus for providing shock and vibration isolation comprises a unitary resilient element formed with an annular circumferential groove intermediate its top and bottom for receiving the edge of a chassis base around an opening through which the apparatus passes to define a foot stage below and an isolator stage above. The isolator stage above carries means for fastening the isolator stage to a second chassis base supported by the isolator stage, a threaded stud comprising the fastening means typically passing through an opening in the second chassis base. The isolator stage may have different shock and vibration characteristics than the foot stage through selection of geometry and/or materials. Ths first or lower chassis base may function as a constraining ring to resist buckling by the structure.

Figure 2:
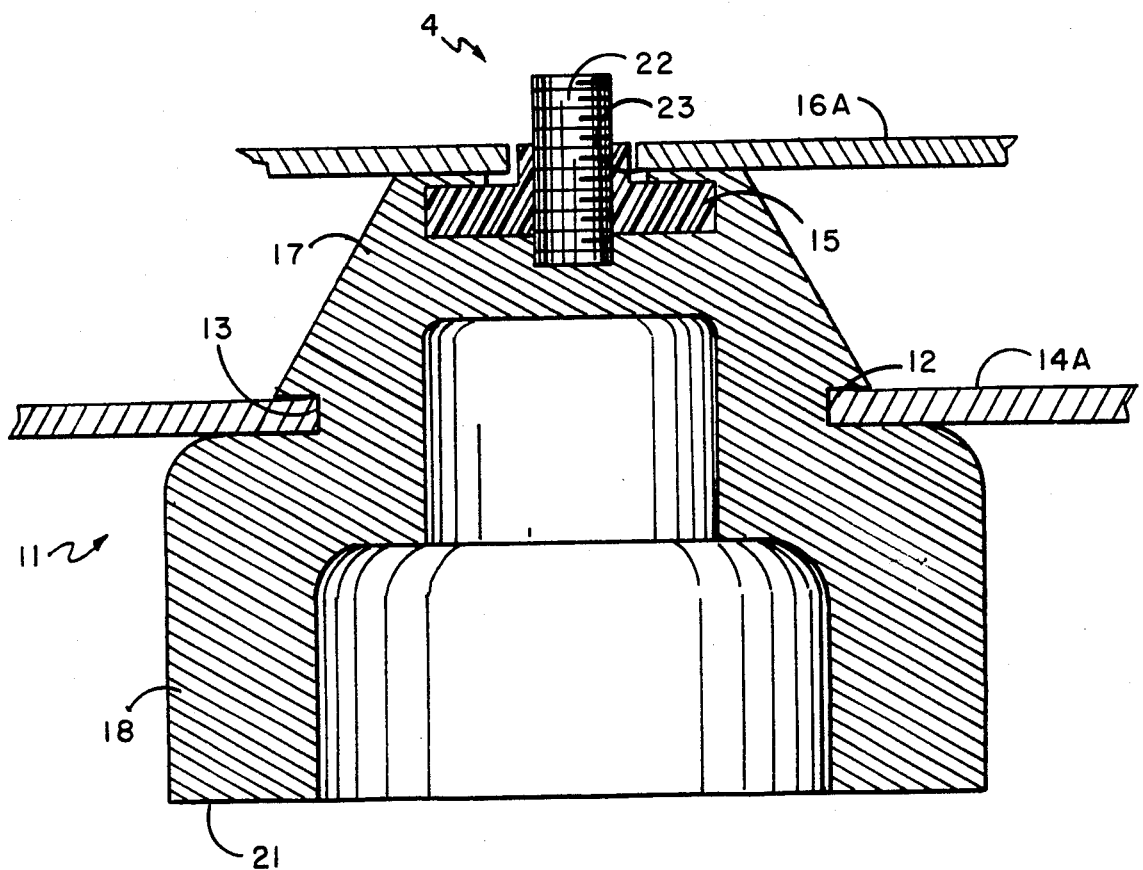

Numerous other features, objects and advantages of the invention will become apparent from the following specification when read in connection with the accompanying drawing in which:

FIG. 1 is a schematic representation of an embodiment of the invention independently providing vibration isolation for a case and a component in the case; and FIG. 2 is a diametrical sectional view through an embodiment of the invention fragmentarily illustrating lower and upper chassis bases supported thereby while providing isolation therebetween.

With reference now to the drawing and more particularly FIG. 1 thereof, there is shown a schematic representation of an embodiment of the invention for supporting a case and a component therein while providing shock and vibration isolation for both the case and the component, including shock and vibration isolation therebetween.

The dual isolating foot 11 is formed with an annular circumferential recess or groove 12 that accommodates the edge 13 of an opening in case 14. The top 15 of isolating foot 11 supports component 16. The upper portion 17 of isolator foot 11 between annular recess 12 and top 15 may be regarded as the isolator stage while the lower portion 18 below recess 12 may be regarded as the foot stage.

The bottom 21 of isolator foot 11 typically rests on a table or other surface to provide antiskid support for case 14 while also providing shock and vibration isolation.

The geometry and materials of isolator stage 17 and foot stage 18 may be adjusted to provide desired shock and vibration isolation characteristics for each stage and may be separate materials preferably bonded together in accordance with the method and using the materials described in U.S. Pat. No. 4,385,025.

Referring to FIG. 2, there is shown a diametrical sectional view of a specific embodiment of the invention with the chassis base of the case and the chassis base of the component inside the case shown fragmentarily to illustrate the relationship among the different components. The same reference symbols identify corresponding elements throughout the drawing. In this example upper and lower portions 17 and 18 of isolator 11 are made of an elastomer. Top 15 may have threaded stud 22 bonded to upper section 17, preferably in accordance with the aforesaid patented process. Upper chassis base 16A carries an opening 23 for accommodating stud 22. A nut (not shown) may then be tightened on stud 22 to hold upper chassis base 16A firmly against top 15. Isolating foot 11 may be first urged through the opening in lower base plate 14A until the edge 13 engages annular circumferential recess 12.

While only one isolating foot has been shown and described to better illustrate the principles of the invention, in a typical installation three or more insulating feet may be used to provide the antiskid support and shock and vibration isolation of the system and between the case and one or more internal components.

The invention may thus be regarded as two distinct elastomeric isolation stages permanently attached to each other forming a continuous elastomeric structure. The bottom portion 18 may be regarded as the foot stage and is typically cylindrical in shape, although it could be of other shapes. This stage may function to support the case above a table or other surface and provide an antiskid mounting point to resist sliding of the case along the table. Lower stage 18 also inhibits the transmission of shock, vibration and noise between case and table or other supporting surface. The upper or isolator stage 17 is typically conical in shape, although it may be cylindrical, rectangular or other shapes and supports component 16 above chassis base 14A.

At the top of isolator stage 17 is fastening means for securing the upper chassis base 16A, which may be a computer printer, to the isolator and may comprise stud 22 or could be, a plastic snap or a through or threaded central opening. This isolator stage 17 also comprises means for inhibiting the transmission of vibration, shock and noise between the printer or other component comprising base 16A, case 14 and the table or other supporting surface.

The invention is easy to install by pressing the upper isolator stage 17 through the opening in lower base 14A until it snaps into place with edge 13 residing in annular circumferential recess 12. Then the upper base 16A of the printer or other component is attached to the top 15 of isolator stage 17.

The energy storage and dissipation characteristics of the elastomer provide isolation to the case and internal component. By modifying the inside and outside surfaces of the elastomer configuration, it is possible to obtain a wide range of stiffnesses, both axially and radially. Two distinct stiffnesses, and therefore two distinct natural frequencies, may be obtained within the isolating structure, one for the foot stage and a second for the isolator stage. Thus, the isolator stage may have a natural frequency distinctly different from that of the foot stage.

It can be seen that the stiffness of each stage is the same in compression as in tension, and each stage is free to move in an axial direction along the normally vertical axis of symmetry of the two stages and all radial directions perpendicular to the normally vertical axis for providing shock and vibration isolation in the axial direction and all radial directions.

There has been described novel apparatus and techniques for isolating and supporting that facilitates establishing isolation between the case of apparatus and a base supporting the apparatus and between the case and an internal component with the same structure used as a foot for supporting the device. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for providing shock and vibration isolation comprising, foot isolating means having a normally vertical axis of symmetry and made of resilient material for providing antiskid support and shock and vibration isolation in an axial direction along and all radial directions perpendicular to said normally vertical axis, said foot isolating means being formed with a circumferential annular recess for receiving the edge of an opening in a base supported thereby intermediate the top and bottom surfaces thereof to divide said foot isolating means into a lower foot section and an upper isolator section and characterized by the same stiffness in both tension and compression, and fastening means secured to the top of said upper isolator section for connection to a component to be isolated for shock and vibration isolation both from a base having an opening edge seated in said annular recess and a support on which said lower foot section is supported, the stiffness in said isolator section being different from that in said foot section, said foot and isolator sections being contiguous portions of a unitary structure that is a resilient elastomer and free to move in said axial and radial directions for providing shock and vibration isolation in said axial direction and said all radial directions, the natural frequency of said foot section being different from the natural frequency of said isolator section.

2. Apparatus for shock and vibration isolation in accordance with claim 1 and further comprising, said base with the edge around said opening seated in said annular recess, and a base of said component fastened by said fastening means to the top of said isolator section.

3. Shock and vibration isolation apparatus in accordance with claims 1 or 2 wherein said fastening means comprises a stud seated and bonded to the top of said isolator stage.

4. Shock and vibration isolation apparatus in accordance with claims 1 or 2 wherein said isolator stage is substantially frustroconical and said foot stage is substantially cylindrical.

5. Apparatus for providing shock and vibration isolation in accordance with claim 1 wherein said foot isolating means is formed with a cylindrical opening about the axis of said foot isolating means separated from said annular recess by an annular region of said resilient material.

6. Apparatus for providing shock and vibration isolation in accordance with claim 1 wherein said fastening means at the top of said upper isolator section is entirely above said annular recess.

7. Apparatus for providing shock and vibration isolation in accordance with claim 5 wherein said fastening means at the top of said upper isolator section is entirely above said cylindrical opening.

8. Shock and vibration isolation apparatus in accordance with claims 1 or 2 wherein said foot section is made of material different from that in said isolator section, the latter materials being bonded together.

* * * * *